US008010498B2

(12) United States Patent
Gounares et al.

(10) Patent No.: US 8,010,498 B2
(45) Date of Patent: Aug. 30, 2011

(54) VIRTUALLY INFINITE RELIABLE STORAGE ACROSS MULTIPLE STORAGE DEVICES AND STORAGE SERVICES

(75) Inventors: Alexander G. Gounares, Kirkland, WA (US); Ashok Kuppusamy, Seattle, WA (US); Dan Teodosiu, Kirkland, WA (US); Raymond E. Endres, Seattle, WA (US); William J. Bolosky, Issaquah, WA (US); John R. Douceur, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 271 days.

(21) Appl. No.: 11/101,610

(22) Filed: Apr. 8, 2005

(65) Prior Publication Data
US 2006/0230076 A1  Oct. 12, 2006

(51) Int. Cl.
G06F 7/00 (2006.01)
G06F 17/00 (2006.01)
G06F 13/00 (2006.01)
G06F 13/28 (2006.01)

(52) U.S. Cl. ..................... 707/665; 711/161; 711/162

(58) Field of Classification Search .................. None
See application file for complete search history.

(56) References Cited

U.S. PATENT DOCUMENTS

| | | | | |
|---|---|---|---|---|
| 5,261,051 A * | 11/1993 | Masden et al. | ............... | 711/152 |
| 5,303,244 A * | 4/1994 | Watson | ............... | 714/5 |
| 5,930,831 A * | 7/1999 | Marsh et al. | ............... | 711/173 |
| 6,088,778 A * | 7/2000 | Ruff et al. | ............... | 711/173 |
| 6,108,759 A * | 8/2000 | Orcutt et al. | ............... | 711/173 |
| 6,178,487 B1 * | 1/2001 | Ruff et al. | ............... | 711/165 |
| 6,202,070 B1 * | 3/2001 | Nguyen et al. | ............... | 707/104.1 |
| 6,253,300 B1 * | 6/2001 | Lawrence et al. | ............... | 711/173 |
| 6,615,365 B1 * | 9/2003 | Jenevein et al. | ............... | 714/6 |
| 6,665,700 B1 | 12/2003 | Sugisaki et al. | | |
| 6,745,303 B2 | 6/2004 | Watanabe | | |

(Continued)

FOREIGN PATENT DOCUMENTS
WO    WO 01/42922 A1    6/2001

(Continued)

OTHER PUBLICATIONS

John R. Douceur, et al., "Large-Scale Simulation of Replica Placement Algorithms for a Serverless Distributed File System", Microsoft Research, 9 pages, Proceedings of 9th IEEE MASCOTS, 2001.

Atul Adya, et al., "FARSITE: Federated, Available, and Reliable Storage for an Incompletely Trusted Environment", Microsoft Research, Appears in 5th Symposium on Operating Systems Design and Implementation (OSDI 2002), Dec. 2002, 14 pp.

(Continued)

*Primary Examiner* — Charles Rones
*Assistant Examiner* — Harold A Hotelling
(74) *Attorney, Agent, or Firm* — L. Alan Collins; Collins & Collins Incorporated

(57) ABSTRACT

A logical file system that distributes copies of files across various different physical storage resources yet provides a consistent view to the user of his or her data, regardless of which machine the user is accessing the files from, and even when the user's computer is offline. The distributed file system uses smart data redundancy to enable a virtually infinite amount of storage as long as additional storage resources are made available to the distributed file system. The result is a reliable storage system that does not necessarily tie the user's data to the user's particular computer. Instead, the user's data is associated with the user—for life—or for however long the user would like the data to be maintained, regardless of whether the user's computer or data storage components are replaced or destroyed.

20 Claims, 8 Drawing Sheets

U.S. PATENT DOCUMENTS

| | | | |
|---|---|---|---|
| 6,785,768 B2 | 8/2004 | Peters et al. | |
| 6,829,610 B1 | 12/2004 | Hickman et al. | |
| 6,996,588 B2 * | 2/2006 | Azagury et al. | 707/204 |
| 7,043,634 B2 * | 5/2006 | Wolff et al. | 713/165 |
| 2003/0120723 A1 * | 6/2003 | Bright et al. | 709/203 |
| 2004/0064474 A1 * | 4/2004 | Hitz et al. | 707/102 |
| 2004/0172421 A1 | 9/2004 | Saito et al. | |
| 2004/0172423 A1 * | 9/2004 | Kaasten et al. | 707/201 |
| 2004/0193824 A1 | 9/2004 | Johnson | |
| 2004/0193879 A1 | 9/2004 | Sonoda et al. | |
| 2004/0267987 A1 | 12/2004 | Deng et al. | |
| 2005/0037787 A1 * | 2/2005 | Bachner et al. | 455/502 |
| 2005/0091289 A1 * | 4/2005 | Shappell et al. | 707/201 |
| 2005/0091595 A1 * | 4/2005 | Shappell et al. | 715/700 |
| 2005/0138084 A1 * | 6/2005 | Azagury et al. | 707/200 |
| 2005/0198385 A1 * | 9/2005 | Aust et al. | 709/245 |
| 2005/0216886 A1 * | 9/2005 | Washburn | 717/110 |
| 2006/0179087 A1 * | 8/2006 | Fujii et al. | 707/205 |

FOREIGN PATENT DOCUMENTS

| | | |
|---|---|---|
| WO | WO 02/27497 A2 | 4/2002 |

OTHER PUBLICATIONS

John Douceur, et al., Modeling Replica Placement in a Distributed File System: Narrowing the Gap between Analysis and Simulation:, Technical Report MSR-TR-2001-62, Microsoft Research, Aug. 2001, 14 pp.

John Douceur, et al., "Modeling Replica Placement in a Distributed File System: Narrowing the Gap between Analysis and Simulation", Microsoft Research, 12 pp., Aug. 2001.

John Douceur, "The Sybil Attack", Microsoft Research, Proceedings of 1st IPTPS, 2002, 6 pp.

William J. Bolosky, et al., "Feasibility of a Serverless Distributed File System Deployed on an Existing Set of Desktop PCs", SIGMETRICS 2000, 10 pp.

John R. Douceur, et al., "A Secure Directory Service based on Exclusive Encryption", Microsoft Research, Proceedings of the 18th ACSAC, Dec. 2002, 11 pp.

Atul Adya, et al., Cooperative Task Management without Manual Stack Management or, Event-driven Programming is Not the Opposite of Threaded Programming, of USENIX 2002 Annual Technical Conference, 14 pp.

John R. Douceur, et al., "Optimizing File Availability in a Secure Serverless Distributed File System", Proceedings of 20th IEEE SRDS, 2001, 10 pp.

William J. Bolosky, et al., "Single Instance Storage in Windows® 2000", Proceedings of the 4th USENIX Windows Systems Symposium, 2000, 12 pp.

John R. Douceur, et al., "Reclaiming Space from Duplicate Files in a Serverless Distributed File System", Microsoft Research, Technical Report MSR-TR-2002-30, 2002, 14 pp.

John R. Douceur, et al., "Reclaiming Space from Duplicate Files in a Serverless Distributed File System", Microsoft Research, Proceedings of 22nd IEEE ICDCS, 2002, 14 pp.

John Douceur, et al., "Competitive Hill-Climbing Strategies for Replica Placement in a Distributed File System", Microsoft Research, Technical Report MSR-TR-2001-60, Jun. 2001, 13 pp.

J. R. Douceur, et al., "Competitive Hill-Climbing Strategies for Replica Placement in a Distributed File System," Proceedings of 15th DISC, 2001, Microsoft Research, 15 pp.

Peter Druschel, et al., "PAST: A large-scale, persistent peer-to-peer storage utility", Date Unknown, 6 pp.

Antony Rowstron, et al., "Storage management and caching in PAST, a large-scale, persistent peer-to-peer storage utility", 2001, 13 pp.

Antony Rowstron, et al., "Pastry: Scalable, decentralized object location and routing for large-scale peer-to-peer systems", Proc. Of the 18th IFIP/ACM International Conference on Distributed Systems Platforms (Middleware 2001), 22 pp.

John MacCormick, et al., "Boxwood: Abstractions as the Foundation for Storage Infrastructure", Microsoft Research, USENIX Association, OSDI'04: 6th Symposium on Operating Systems Design and Implementation, pp. 105-120, published in 2004.

Sanjay Ghemawat, et al., "The Google File System", SOSP'03, 15 pp, published in 2003.

http://www.microsoft.com/windows2000/server/evaluation/business/management.asp, Apr. 7, 2005, 5 pp.

http://www.laplink.com/, Apr. 6, 2005, 2 pp.

http://www.filetrust.com/home/default.jsp, Apr. 6, 2005, 1 pp.

http://channels.lockergnome.com/search/archives/20050216__grouper__p2p__personal__media__file__sharing.phtml, Apr. 6, 2005, 8 pp.

http://www.filesanywhere.com, Apr. 6, 2005, 1 pp.

http://filegenie.com.com/home.cgx, Apr. 6, 2005, 1 pp.

http://www.biscu.com/, Apr. 6, 2005, 2 pp.

http://www.beinsync.com/what__is__beinsync.php, Apr. 6, 2005, 2 pp.

http://www.bigvault.com/, Apr. 6, 2005, 1 pp.

http://www.swapdrive.com/sdbackup.asp, Apr. 6, 2005, 2 pp.

http://www.xdrive.com/, Apr. 6, 2005, 2 pp.

http://www.iora.com/home/home.asp, Apr. 6, 2005, 2 pp.

http://www.mirra.com/product/index.html, Apr. 6, 2005, 2pp.

http://www.mydocsonline.com, Apr. 6, 2005, 2 pp.

http://www.my-files.com/, Apr. 6, 2005, 2 pp.

http://www.storagevault.net/, Apr. 6, 2005, 2 pp.

http://www.storegate.com/001.aspx?flash=yes, Apr. 6, 2005, 2 pp.

http://www.streamload.com, Apr. 6, 2005, 2 pp.

Product Description Guide for EMC Centera, Content Addressed Storage, 2003, 21 pp.

http://www.ibackup.com/, Apr. 6, 2005, 2 pp.

http://www.globedesk.com/service/faq.html, Apr. 6, 2005, 2 pp.

http://www.microsoft.com/technet/prodtechnol/windowsserver2003/library/TechRef/997eb538-387d-4086-97ee-ccc16ff8788e.mspx, Apr. 6, 2005, 7 pp.

http://www.microsoft.com/technet/prodtechnol/windowsserver2003/library/TechRef/69ec0c55-b287-4fbe-8fd3-c379fbc2d149.mspx, Apr. 6, 2005, 6 pp.

Microsoft Windows Server 2003, Simplifying Infrastructure Complexity with the Windows Distributed File System, Microsoft Corporation, Published Mar. 2003, 16 pp.

http://www.onecomputerguy.com/w2k/w2k__csc/, Apr. 6, 2005, 8 pp.

Microsoft Windows Server 2003, Server Clusters: Storage Best Practices for Windows 2000 and Windows Server 2003, Microsoft Corporation, Published Jan. 2003, 21 pp.

http://research.microsoft.com/research/sv/kohinoor/, Apr. 6, 2005, 2 pp.

http://www.groove.net/index.cfm?pagename=filesharing, Apr. 6, 2005, 4 pp.

http://www.groove.net/index.cfm/pagename/VirtualOffice/, Apr. 6, 2005, 4 pp.

http://www.mac.com/1/iTour/tour__idisk.html, Mar. 7, 2005, 2 pp.

http://www.apple.com/macosx/features/idisk/, Mar. 7, 2005, 2 pp.

http://www.winnetmag.com/windows/article/articleid/22952/22952.html, Jan. 26, 2005, 3 pp.

Craig J. Patten, et al., "Towards a Scalable Metacomputing Storage Service", Advanced Computational Systems Cooperative Research Center Department of Computer Science, University of Adelaide, Technical Report DHPC-058, Dec. 1998, 11 pp.

John Björklund, "The OceanStore Project", The University of California, Berkeley, Research Seminar on Middleware for Mobile Computing, Jun. 2, 2002, 6 pp.

http://oceanstore.cs.berkeley.edu/info/overview.html, Dec. 29, 2004, 2 pp.

http://dmoz.org/Computers/Software/Internet/Clients/File__Sharing/, Mar. 7, 2005, 3 pp.

http://now.cs.berkeley.edu/, Mar. 7, 2005, 2 pp.

http://now.cs.berkeley.edu/Sfs/wfs.html, Mar. 7, 2005, 2 pp.

http://research.microsoft.com/sn/Farste/related__work.aspx, Mar. 7, 2005, 1 pp.

http://research.microsoft.com/sn/Farsite/, Mar. 7, 2005, 2 pp.

http://research.microsoft.com/sn/Farsite/faq.aspx, Mar. 7, 2005, 5 pp.

http://www.pcmag.com/article2/0,1759,1206500,00.asp, Mar. 8, 2005, 4 pp.

* cited by examiner

VIRTUALLY INFINITE RELIABLE STORAGE ACROSS MULTIPLE STORAGE DEVICES AND STORAGE SERVICES

FIELD OF THE INVENTION

Aspects of the present invention are directed to providing a distributed file storage system across multiple storage devices.

BACKGROUND OF THE INVENTION

As the amount and the emotional value of data such as digital media stored by consumers grows, so does their need to store this media reliably over extended periods of time. One way to accomplish this is to store their data across a set of distributed storage resources. For example, users may store their data locally on one or more separate devices and/or remotely using one or more hosted storage facilities or services. The advantage of storing data in more than one location is that the data is more likely to be available at the time that it is requested.

Various services exist to synchronize and backup data across multiple storage resources. For example, a distributed virtual disk system has been conceived, known as Petal, that provides for virtualization at the block level and allows a single logical volume to span multiple physical storage devices. However, while this approach would allow implementation of scalable storage by growing the logical volume when new disks are added, it has a number of serious drawbacks. For instance, because file system metadata is not replicated throughout the system, the removal or crash of any physical disk is likely to cause some irrecoverable damage/loss to the metadata. This may cause the entire logical volume to be unusable. Also, a single software error (e.g. a bug in the file system) may suddenly corrupt the entire logical volume. In addition, Petal is not designed to allow a user to selectively specify a desired reliability target at the individual object level (e.g. file or directory), since the virtualization layer of Petal views data in terms of blocks but not files or directories. Finally, if a physical disk is removed and mounted on another system in isolation, the disk will not have a self-contained file system, and thus the information stored on the disk will be unreadable for consumers.

Another distributed file system, known as Farsite, uses multiple physical disks attached to machines interconnected by a local area network (LAN). However, the implementation of Farsite is highly complex; a complete re-implementation of the file system is required. Achieving a high level of reliability for a new file system typically takes several years. In addition, individual physical disks in Farsite may not have a consumer-readable self-contained file system and thus may not be readable in isolation, e.g. when plugged into another machine.

Yet another way to create a distributed file system is to construct a single namespace out of multiple disjoint file system volumes using one of the existing mechanisms in operating systems such as the Microsoft WINDOWS line of operating systems. However, partitioning of the single namespace across the multiple physical disks may be too coarse and make certain operations difficult and inefficient. For instance, if one of the disks becomes full, then the system would need to move an entire directory sub-tree off to another disk. This may consume an inordinate amount of disk bandwidth. It is also difficult to selectively specify the desired reliability target at the individual object level (e.g. the file or directory), given that all files and directories placed on a physical disk typically share those settings. In addition, this approach requires a volume-level mirroring solution (RAID) with all the well-known drawbacks that approach has for consumer scenarios.

Accordingly, new solutions are needed to provide consumers with a way to easily, reliably, efficiently, and flexibly maintain their data.

SUMMARY OF THE INVENTION

Aspects of the present invention are directed to new seamlessly scalable and reliable distributed storage solutions. From the user's point of view, a single seamless storage resource is provided across multiple volumes. The various volumes may be located on separate physical storage devices and may be associated with the same or different computers in a network. Regardless of where data is physically stored and which computer is being used, and even if it is offline from the network, from the user's point of view the aggregate storage is presented simply as a larger C: drive (for example). Files and other data may be distributed among any of various types of physical storage resources. For example, a seamless distributed file resource may be made up of various hard drives, both local and on other computers, as well as "cloud" storage purchased from a service provider over the Internet and/or another network.

Further aspects of the present invention are directed to replicating the content of only a subset of files onto the various volumes, while all of the directory information is stored on all of the volumes. This provides a much higher reliability than if each volume stored only a portion of the total aggregate directory information.

Further aspects of the present invention are directed to making such a seamless distributed storage resource easily expandable. For example, in response to plugging in additional hard drives or using hard drives on another computer, storage may be automatically expanded to include the new devices. Instead of seeing multiple volumes, the user should just see a larger C: drive (for example) on their machine in response to plugging in the additional drive or adding storage units on another computer. Depending on the user preferences, the additional storage may be used by the system to automatically and seamlessly increase the amount of data that can be stored and/or to automatically and seamlessly increase the reliability of that data by creating redundant copies.

Still further aspects of the present invention are directed to allowing the user to specify a storage policy that may be global or at the individual object level such as for single files or directories. The storage policy may include a replication level that specifies the number (or the minimum number) of copies that should be maintained for a particular file. For example, depending on the importance of their data, users may want to specify a particular replication level between 1 and k, where k does not exceed the number of physical volumes in the system since storing multiple copies of a file on the same disk does not significantly improve reliability. For instance, a user may want to always keep three copies of her photos and two copies of her word processing documents. Additionally, for particularly valuable data, users may want to specify that one copy of the files should at all times be stored in the cloud storage.

Yet further aspects of the present invention are directed to gracefully handling the situation where one of the volumes becomes unavailable, either expectedly or unexpectedly. In this situation, the system may perform any required repair or rebalancing operations automatically without the need for any user intervention. For example, a hard drive may fail, be removed from the system temporarily or permanently, or in the case of a remote hard drive on the other side of a network, the network may fail and thereby cause the hard drive to be unavailable for lack of communication. For those objects stored on that hard drive that have a replication level greater than one (i.e., for which the user has directed the system to keep at least two copies on two separate volumes, or to keep one copy in the cloud storage), then such unavailability of a single hard drive would not significantly impact the accessibility of those objects. Responsive to detecting that the hard drive has become unavailable, and possibly depending upon the reason for the unavailability, the system may automatically restore the desired replication level in the background by creating additional copies of those objects, without the need for any user intervention.

According to various further aspects of the present invention, there may be no size constraints imposed on the physical storage resources used in the system. Thus, different hard drives or other physical storage resources may have different storage capacities. This is useful if one considers the fact that consumers may be adding hard drives, for example, over a period of several years, where it is expected that hard drive capacities will significantly increase during that period.

Still further aspects of the present invention are directed to providing a distributed storage system that may work on top of existing file systems, such as the Microsoft WINDOWS NTFS file system. Thus, an entirely new file system would not need to be created to practice aspects of the present invention. This may make the distributed storage system easier to implement and more reliable, and it preserves the substantial investments already made in existing local file systems.

In yet further aspects of the present invention, individual physical storage resources (such as an individual hard drive) may still be readable in isolation from the user's point of view. Also, individual physical storage resources may be transferable to a different distributed storage system. This could allow savvy consumers to physically ship large volumes of data on actual hard drives, for example, instead of transferring them over the Internet.

Thus, using various aspects of the present invention, the user may have access to a virtually infinite storage resource that scales to the user's needs. In addition, this virtually infinite storage resource may provide a single logical view to the user across all of the user's machines, that is particular to the user. The user may access his or her data from anywhere, even from another machine that is not normally under the user's administrative control, such as through an Internet webpage. Due to the smart redundancy provided by the system and the fact that data is no longer tied to the user's particular computer, the data stored thereon is highly protected from disastrous failure, and so the user's data is effectively protected and considered to be reliable for the user's entire life or as long as desired.

These and other aspects of the invention will be apparent upon consideration of the following detailed description of illustrative embodiments.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

DETAILED DESCRIPTION OF ILLUSTRATIVE EMBODIMENTS

Figure 1:
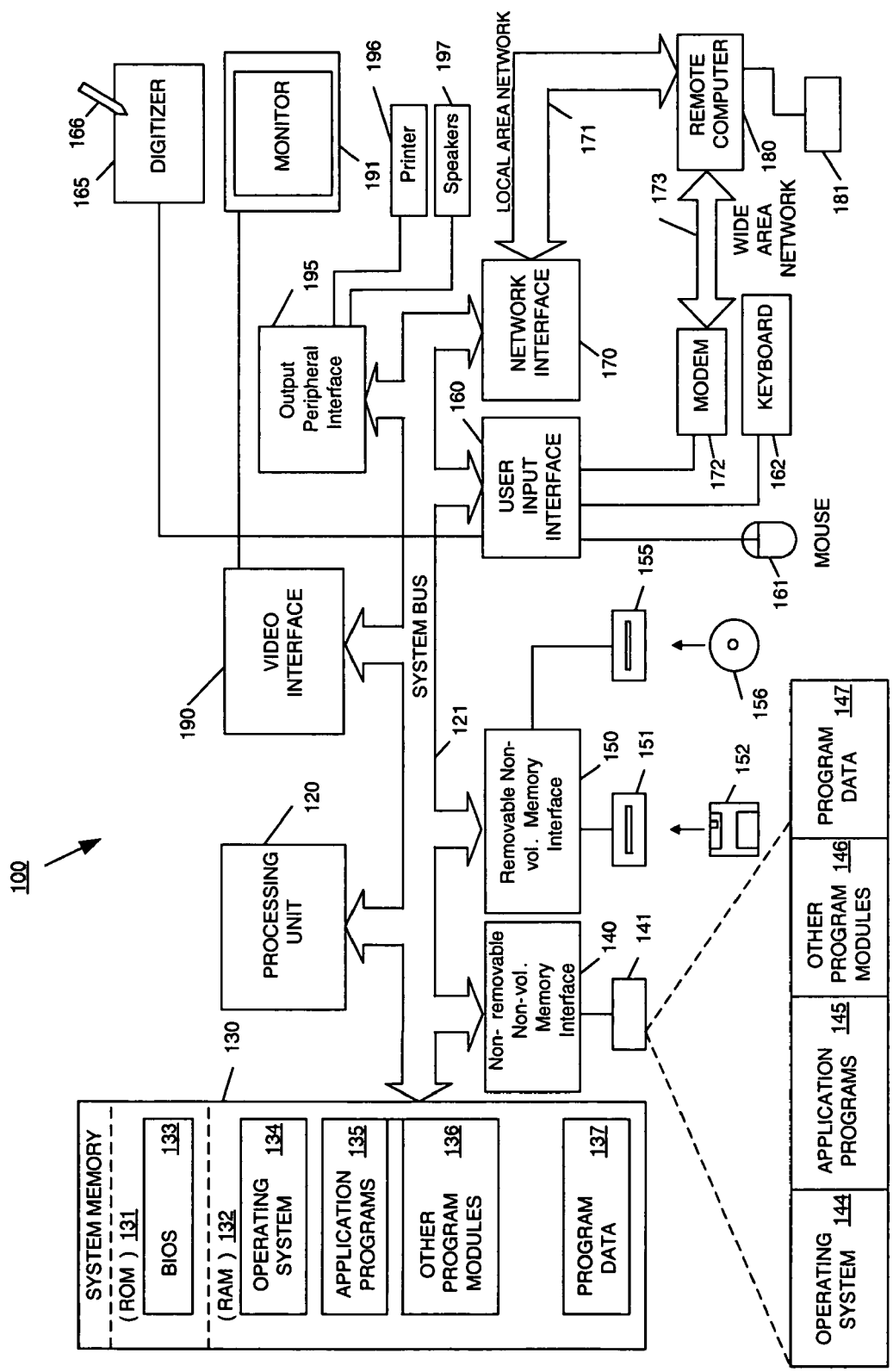
FIG. 1 is a functional block diagram of an illustrative computer that may be used to implement various aspects of the present invention.

FIG. 1 illustrates an example of a suitable computing system environment 100 in which aspects of the invention may be implemented. Computing system environment 100 is only one example of a suitable computing environment and is not intended to suggest any limitation as to the scope of use or functionality of the invention. Neither should computing system environment 100 be interpreted as having any dependency or requirement relating to any one or combination of components illustrated in illustrative computing system environment 100.

The invention is operational with numerous other general purpose or special purpose computing system environments or configurations. Examples of well known computing systems, environments, and/or configurations that may be suitable for use with the invention include, but are not limited to, personal computers (PCs); server computers; hand-held and other portable devices such as personal digital assistants (PDAs), tablet PCs or laptop PCs; multiprocessor systems; microprocessor-based systems; set top boxes; programmable consumer electronics; network PCs; minicomputers; mainframe computers; distributed computing environments that include any of the above systems or devices; and the like.

Aspects of the invention may be described in the general context of computer-executable instructions, such as program modules, being executed by a computer. Generally, program modules include routines, programs, objects, components, data structures, etc. that perform particular tasks or implement particular abstract data types. The invention may also be operational with distributed computing environments where tasks are performed by remote processing devices that are linked through a communications network. In a distributed computing environment, program modules may be located in both local and remote computer storage media including memory storage devices.

With reference to FIG. 1, illustrative computing system environment 100 includes a general purpose computing device in the form of a computer 100. Components of computer 100 may include, but are not limited to, a processing unit 120, a system memory 130, and a system bus 121 that couples various system components including system memory 130 to processing unit 120. System bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Advanced Graphics Port (AGP) bus, and Peripheral Component Interconnect (PCI) bus, also known as Mezzanine bus.

Computer 100 typically includes a variety of computer-readable media. Computer readable media can be any available media that can be accessed by computer 100 such as volatile, nonvolatile, removable, and non-removable media. By way of example, and not limitation, computer-readable media may include computer storage media and communication media. Computer storage media may include volatile, nonvolatile, removable, and non-removable media implemented in any method or technology for storage of information such as computer-readable instructions, data structures, program modules or other data. Computer storage media includes, but is not limited to, random-access memory (RAM), read-only memory (ROM), electrically-erasable programmable ROM (EEPROM), flash memory or other memory technology, compact-disc ROM (CD-ROM), digital video disc (DVD) or other optical disk storage, magnetic cassettes, magnetic tape, magnetic disk storage or other magnetic storage devices, or any other medium which can be used to store the desired information and which can accessed by computer 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF) (e.g., BLUETOOTH, WiFi, UWB), optical (e.g., infrared) and other wireless media. Any single computer-readable medium, as well as any combination of multiple computer-readable media, are both intended to be included within the scope of the term "computer-readable medium" as used herein.

System memory 130 includes computer storage media in the form of volatile and/or nonvolatile memory such as ROM 131 and RAM 132. A basic input/output system (BIOS) 133, containing the basic routines that help to transfer information between elements within computer 100, such as during start-up, is typically stored in ROM 131. RAM 132 typically contains data and/or program modules that are immediately accessible to and/or presently being operated on by processing unit 120. By way of example, and not limitation, FIG. 1 illustrates software in the form of computer-executable instructions, including operating system 134, application programs 135, other program modules 136, and program data 137.

Computer 100 may also include other computer storage media. By way of example only, FIG. 1 illustrates a hard disk drive 141 that reads from or writes to non-removable, non-volatile magnetic media, a magnetic disk drive 151 that reads from or writes to a removable, nonvolatile magnetic disk 152, and an optical disk drive 155 that reads from or writes to a removable, nonvolatile optical disk 156 such as a CD-ROM, DVD, or other optical media. Other computer storage media that can be used in the illustrative operating environment include, but are not limited to, magnetic tape cassettes, flash memory cards, digital video tape, solid state RAM, solid state ROM, and the like. Hard disk drive 141 is typically connected to system bus 121 through a non-removable memory interface such as an interface 140, and magnetic disk drive 151 and optical disk drive 155 are typically connected to system bus 121 by a removable memory interface, such as an interface 150.

The drives and their associated computer storage media discussed above and illustrated in FIG. 1 provide storage of computer-readable instructions, data structures, program modules and other data for computer 100. In FIG. 1, for example, hard disk drive 141 is illustrated as storing an operating system 144, application programs 145, other program modules 146, and program data 147. Note that these components can either be the same as or different from operating system 134, application programs 135, other program modules 136, and program data 137, respectively. Operating system 144, application programs 145, other program modules 146, and program data 147 are assigned different reference numbers in FIG. 1 to illustrate that they may be different copies. A user may enter commands and information into computer 100 through input devices such as a keyboard 162 and a pointing device 161, commonly referred to as a mouse, trackball or touch pad. Such pointing devices may provide pressure information, providing not only a location of input, but also the pressure exerted while clicking or touching the device. Other input devices (not shown) may include a microphone, joystick, game pad, satellite dish, scanner, or the like. These and other input devices are often coupled to processing unit 120 through a user input interface 160 that is coupled to system bus 121, but may be connected by other interface and bus structures, such as a parallel port, game port, universal serial bus (USB), or IEEE 1394 serial bus (FIREWIRE). A monitor 191 or other type of display device is also coupled to system bus 121 via an interface, such as a video interface 190. Video interface 190 may have advanced 2D or 3D graphics capabilities in addition to its own specialized processor and memory.

Computer 100 may also include a touch-sensitive device 165, such as a digitizer, to allow a user to provide input using a stylus 166. Touch-sensitive device 165 may either be integrated into monitor 191 or another display device, or be part of a separate device, such as a digitizer pad. Computer 100 may also include other peripheral output devices such as speakers 197 and a printer 196, which may be connected through an output peripheral interface 195.

Computer 100 may operate in a networked environment using logical connections to one or more remote computers, such as a remote computer 180. Remote computer 180 may be a personal computer, a server, a router, a network PC, a peer device or other common network node, and typically includes many or all of the elements described above relative to computer 100, although only a memory storage device 181 has been illustrated in FIG. 1. The logical connections depicted in FIG. 1 include a local area network (LAN) 171 and a wide area network (WAN) 173, but may also or alternatively include other networks, such as the Internet. Such networking environments are commonplace in homes, offices, enterprise-wide computer networks, intranets and the Internet.

When used in a LAN networking environment, computer 100 is coupled to LAN 171 through a network interface or adapter 170. When used in a WAN networking environment, computer 100 may include a modem 172 or another device for establishing communications over WAN 173, such as the Internet. Modem 172, which may be internal or external, may be connected to system bus 121 via user input interface 160 or another appropriate mechanism. In a networked environment, program modules depicted relative to computer 100, or portions thereof, may be stored remotely such as in remote storage device 181. By way of example, and not limitation, FIG. 1 illustrates remote application programs 182 as residing on memory device 181. It will be appreciated that the network connections shown are illustrative, and other means of establishing a communications link between the computers may be used.

As discussed previously, touch-sensitive device 165 may be a device separate from or part of and integrated with computer 100. In addition, any or all of the features, subsystems, and functions discussed in connection with FIG. 1 may be included in, coupled to, or embodied integrally as part of, a tablet-style computer. For example, computer 100 may be configured as a tablet-style computer a or handheld device such as a PDA where touch-sensitive device 165 would be considered the main user interface. In such a configuration touch-sensitive device 165 may be considered to include computer 100. Tablet-style computers are well-known. Tablet-style computers interpret gestures input to touch-sensitive device 165 using stylus 166 in order to manipulate data, enter text, create drawings, and/or execute conventional computer application tasks such as spreadsheets, word processing programs, and the like. Input may not only be made by stylus 166, but also by other types of styli such as a human finger.

Figure 2:
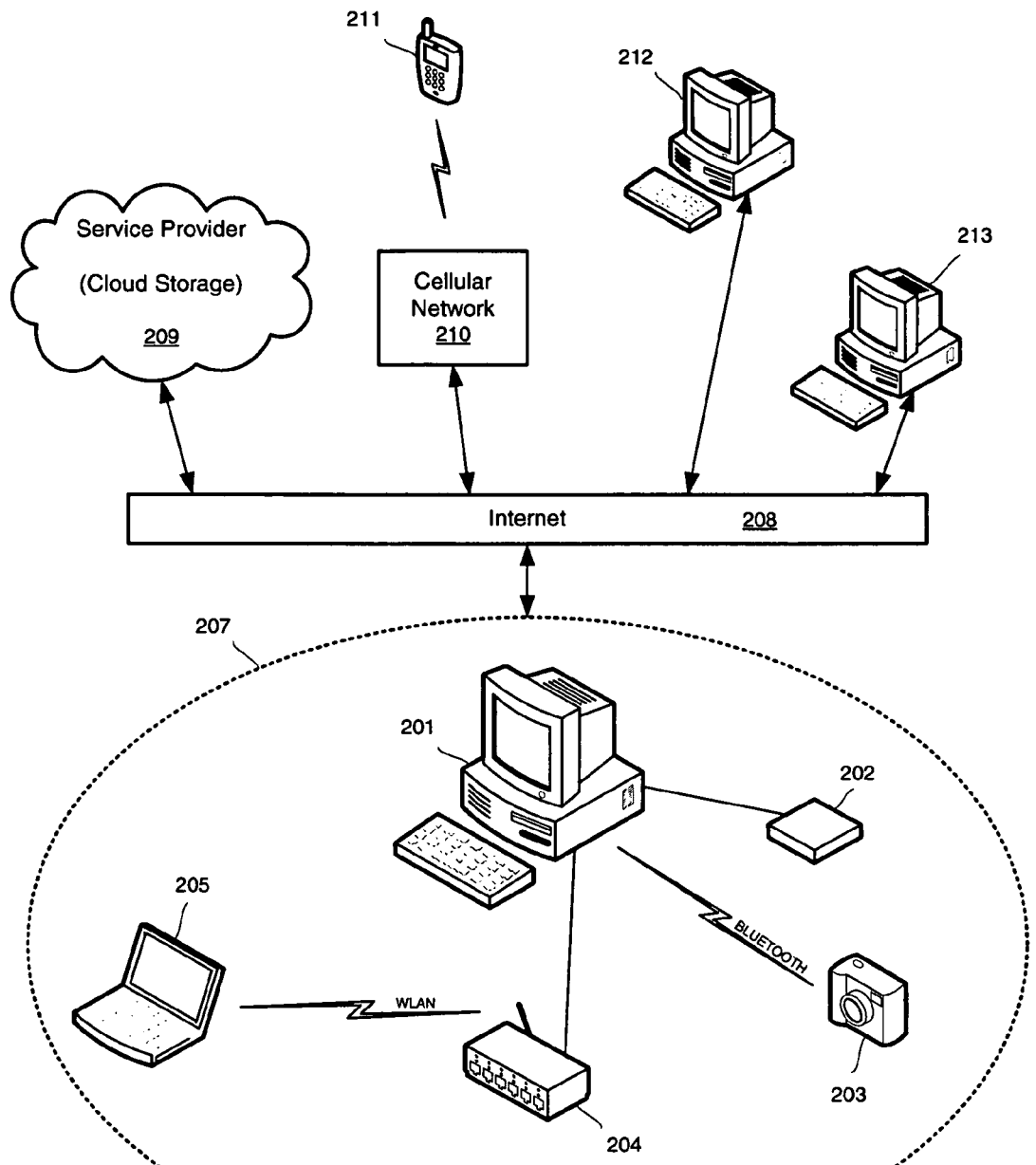
FIG. 2 is a functional block diagram of an illustrative computer network.

Referring to FIG. 2, an illustrative computer network is shown. As shown, a user's computer 201 is coupled to various other elements within a local area network (LAN) 207. Computer 201 may be configured such as shown in FIG. 1, and thus may have its own on-board hard drive and/or other storage devices. Computer 201 may additionally have a locally-connected additional hard drive 202 and/or other local storage devices. For example, a digital camera 203 may be coupled to computer 201, such as via a wireless BLUETOOTH connection. From the point of view of computer 201, digital camera 203 may be considered to be a local data storage device. In other words, digital camera 203 may be used to store data, such as photo files, which can be accessible by computer 201. A LAN hub 204 is also coupled to computer 201 and is the basis for the wireless portion of LAN 207. Other computers, such as laptop computer 205, may be wirelessly connected (or hardwired) to hub 204. Laptop computer 205 may also be considered a data storage device accessible by computer 201 via hub 204. In this case, laptop computer 205 may not be considered a local device relative to computer 201, but instead is considered a peer of computer 201. The term "peer" as used herein relative to computer 201 will refer to computing devices that control their own storage and that are under the administrative control of the entity (e.g., the user or other system administrator) that controls computer 201. Thus, communications between computer 201 and laptop 205 are termed herein as "peer-to-peer" communications.

Hub 204 may further have router functionality and may couple LAN 207 with the Internet 208, such as via a cable or DSL modem (not shown). As is well known, the Internet 208 provides computer 201 with access to a wide variety of websites and services, as well as communications with other users. For example, a service provider 209 may be in the business of providing hosted data storage services to users of the Internet 208. This is also referred to herein as "cloud storage," since the customer does not necessarily know or care about where his or her data is physically stored. Instead, from the customer's point of view, the data is simply stored the cloud storage service provider. Cloud storage is not under the administrative control of the entity that controls computer 201. Instead, the entity that controls computer 201 is a customer of service provider 209, and service provider 209 is responsible for ensuring (and indeed has an obligation to ensure) that the customer's data is stored in accordance with the customer's requests, e.g. concerning availability and reliability.

Typically, service provider 209 and the customer (who in this example is the user of computer 201) have a service-level agreement that sets forth the data storage and availability requirements that are to be followed by service provider 209. For example, service provider 209 may promise to provide at least a given amount of availability to the data such that the customer can rely on being able to access his or her data when it is needed. The service-level agreement may further provide for a promise of providing an agreed-to amount of data storage. For instance, the service-level agreement may guarantee 1.0 GB of storage for the customer, with 99.999% availability assuming that the customer's own local equipment is working properly. The amount of storage reserved for the customer may be changed as desired. For instance, if the customer would like to increase the amount of available data storage, say to 2.0 GB, then the customer may request such an increase from service provider 209.

A cellular telephone and/or pager network 210 may also be coupled to the Internet 208. This allows information such as text messages to be passed between computer 201 and a cellular phone 211, which may also have an integrated personal digital assistant (PDA). In addition, as memory becomes cheaper, portable devices such as cellular phone 211 are more likely to contain substantial amounts of memory such as on removable memory cards. Thus, using appropriate software, cellular phone 211 may be viewed as another data storage device from the point of view of computer 201. In addition, various other individual users may have their own computers 212, 213 and/or LANs coupled to the Internet 208. Again, depending upon the software being used and any prior agreements between the various users, these remote computers 212, 213 may be considered data storage devices from the point of view of computer 201. Of course, many configurations other than that shown in FIG. 2 are possible.

The user of computer 201 may decide to store his or her data in a number of ways. For example, the user may decide to store only a single copy of most files, where most file are stored on the internal hard drive of computer 201, recently-taken photographs are stored on digital camera 203, personal files are stored on hard drive 202 (which the user may connect and disconnect as needed), work-related files are stored on laptop computer 205, and the remaining files are stored in the cloud storage of service provider 209. This is a form of distributed storage, in that the user's data is distributed among various different storage resources.

Another way to distribute data among various storage resources is to replicate the data. In other words, it may be desirable to maintain multiple identical copies of certain data such as files. For example, a particular file or set of files may be stored locally such as within the internal hard drive of computer 201, and an identical copy of that file or those files may also be stored remotely such as in the cloud storage of service provider 209. Although this requires more storage than would a single copy, such replication may be desirable where there is little tolerance for data loss. Such a configuration can protect against certain data loss or unavailability scenarios. For example, if certain data is stored only locally in devices within the user's home, and if that home were destroyed by fire, then it is likely that the data will be permanently destroyed as well. Or, where certain data is stored only remotely such as in cloud storage, then loss of Internet accessibility would prevent the user from being able to access the data, at least temporarily. It should come as no surprise that both of these situations can be extremely undesirable, and in many cases users would consider such a risk intolerable.

To substantially reduce the possibility that such scenarios could result in data loss or unavailability, data may be replicated such that identical copies of the data are stored in multiple different storage resources. Thus, if one of the storage resources becomes unavailable, another one of the storage resources may be used to access data. Replication may be performed by software commonly known as a replicator. The replicator may be executed by computer 201 and/or by any other machine or entity, such as by service provider 209. In general, to determine the probability of failure using replicated storage on multiple storage resources, the individual probabilities of inaccessibility (such as by failure) are multiplied together. For instance, assume that it can be expected that on average the built-in hard drive of computer 201 will be unavailable one percent of the time over the next year, and that on average the cloud storage of service provider 209 will be unavailable one tenth of one percent of the time over the next year (e.g., due to inherent hard drive failure or the user's house burning down). Then, by storing identical copies on both there will be a composite unavailability over the next year of 0.01×0.001=0.001%, or only one thousandth of a percent. It can therefore be seen that the risk of data inaccessibility depends both on the number of replications of that data among different storage resources, as well as the reliability of those storage resources themselves.

Replicators are well known. In accordance with aspects of the present invention, various factors can be used by a replicator to determine when and whether to replicate a data file, as well as to where such a replication should be made. The replicator may compare these factors to a predetermined storage policy in making such a determination. The storage policy may define a set of thresholds, ranges, or other criteria that should be maintained in order to provide for an acceptable amount of data safety, or availability. For example, the storage policy may specify a particular replication level. Or, the storage policy may require that an identical copy of a certain data file always resides on the cloud storage provided by service provider 209. Or, the storage policy may require that only certain types of files, such as those designated manually by the user or those that are automatically selected by computer 201, are always replicated so as to have at least a certain number of identical copies. In general, the storage policy may define criteria relating to, e.g., the minimum number of replications and/or the locations of replications. In addition, the storage policy may define static and/or dynamic criteria. Where dynamic, the criteria of the storage policy may depend upon the historical and/or current reliability of various storage resources, the type of file being replicated, and/or any other factors. Any combination of various static and/or dynamic criteria may be defined by the storage policy.

Figure 3:
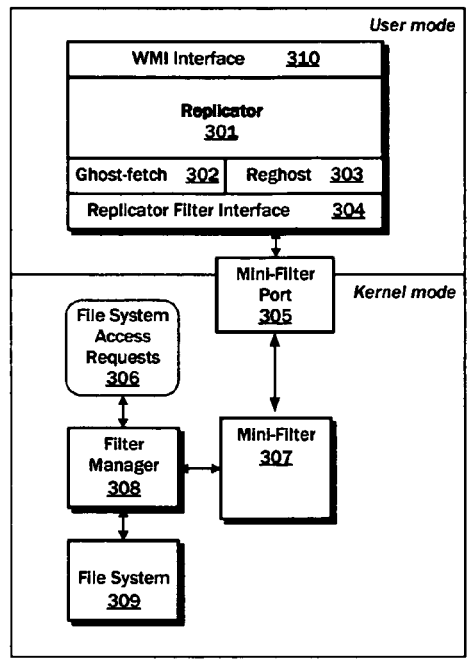
FIG. 3 is a functional block diagram of an illustrative file replication system.

FIG. 3 shows a block diagram of various software modules including an illustrative replicator 301 working in conjunction with a file system 309. In one embodiment, the file system 309 may be a local file system such as the Microsoft WINDOWS NTFS file system. The various shown software modules may run on the user's computer, such as computer 201. A replicator 301 is shown, which in this embodiment is a multi-master file replicator that maintains and synchronizes multiple directory trees. The directory trees may be located on the same or different machines and volumes. Volumes may be separated physically and/or logically. For example, two different hard drives may each be considered a different volume, or a single hard drive may contain multiple different logical volumes. Replicator 301 may replicate any change made to one of the directory trees, such as file creation, modification, or deletion, to all the other directory trees. Replicator 301 may run as a system service and may be configured and monitored via a configuration and monitoring interface, such as a WMI interface 310.

In addition to the basic replication functionality, replicator 301 may have a feature called ghosting that allows replication of file content to occur only on demand. In some embodiments, when ghosting is enabled, only the file metadata (such as the file name, creation date, and alternate data streams; i.e. data associated with a particular file or set of files, other than the actual file content) is replicated by default; the actual file data (i.e. the unnamed data stream) is only replicated on demand when an application opens a file or instructs replicator 301 via its WMI interface 310 to force replication of the actual file data. Files that only have their metadata replicated are called ghosted files. A ghosted file is unghosted and turned into a full file when the actual file data is replicated.

Ghosting may be implemented in replicator 301 via a mini-filter 307 running in kernel mode that tracks accesses to files. Replicator 301 and mini-filter 307 may communicate via a mini-filter port 305. Ghosted files may each be associated with a special reparse point set on them. As part of processing an access request 306 to a file, a kernel filter-manager 308 activates mini-filter 307. Responsive to detecting an access request to a file with a reparse point, mini-filter 307 communicates this to replicator 301 running in user mode. In response, replicator 301 fetches the file data for the accessed file (from one of the other replicas that has the full file) and supplies the file data back to mini-filter 307. The mini-filter then stores the file data on disk and allows the access to proceed.

Figure 4:
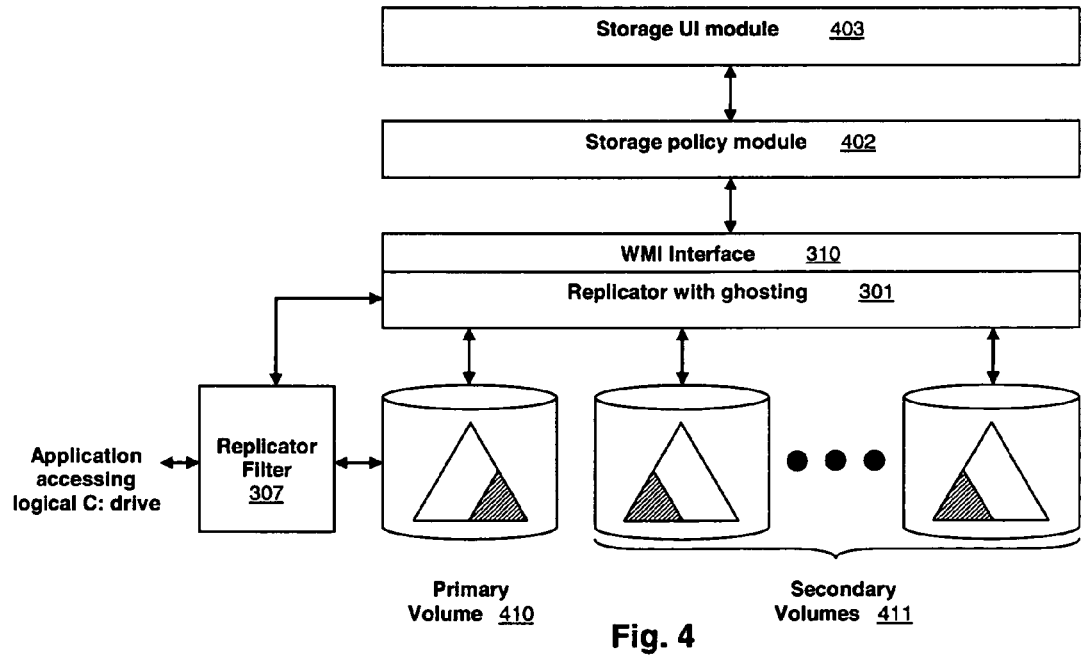
FIG. 4 is a functional block diagram of an illustrative distributed storage system including the file replication system of FIG. 3.

In operation, and referring to FIG. 4, the user may begin with an initial disk (such as their C: drive) that will be referred to herein as primary volume 410. As the user wishes to expand their storage capacity or increase the reliability of their data, they may be prompted by the system to add additional physical storage resources, which will be referred to herein as secondary volumes 411. Primary and secondary volumes 410, 411 may be located on local physical storage devices (e.g., the local C: drive or locally-connected hard drive 202) or on remote physical storage devices (e.g., cloud storage 209). For example, secondary volume 411 may be a directly-attached hard disk (that may connect to the user's computer via, e.g., USB or FireWire) or a network-attached storage device. The user may add a secondary volume at any time, on the fly, to dynamically expand the aggregate storage resource available to the user. Each time a secondary volume is added, the total aggregate storage capacity is automatically increased without the need for any further user intervention. Any appropriate replication and moving of files is preferably done behind the scenes by the system, again without the need for user intervention.

To provide optimal reliability, primary and secondary volumes 410, 411 are preferably located on different respective physical storage devices, although this is not necessary to practice the invention. In this situation, replicator 301 will maintain the directory structure and all the file metadata synchronized between primary volume 410 and all secondary volumes 411. This means that each secondary volume 411 will have a complete copy of the directory tree and file metadata. This redundancy is practical since even if the user had e.g. 1 MB of files this would require no more than about 1 GB of storage, which is a small and inexpensive fraction of today's ever-expanding disk capacities. While the directory structure and file metadata is replicated across all volumes 410, 411, the actual file data (i.e., the actual content of a file)

may not be. As will be discussed further, for each file the system automatically decides which of the volumes will receive a copy of the file data. Some volumes will have a full copy of a file while other volumes will have merely a ghosted version of the file. In other words, some volumes will store just the metadata for a given file without storing the actual file data.

From the user's point of view, file accesses are typically directed at primary volume 410, regardless of which volume stores the actual file data. If the file data (i.e., the file content) is found on primary volume 410, then file access proceeds normally from primary volume 410. However, if the accessed file is ghosted on primary volume 410 (i.e., the file data itself is stored on one of the secondary volumes 411 but not on primary volume 410), then mini-filter 307 intercepts the access and directs the file access to replicator 301. In response, replicator 301 un-ghosts the file (by copying the file data to primary volume 410) and allows the file access to proceed normally.

In addition to the replicator 301, FIG. 4 shows two other components. In particular, a storage policy module 402 decides which of the volumes 410, 411 receives the full copy of a file and which receives only a ghosted version (i.e., just the metadata for the file). Storage policy module 402 applies the storage policies previously discussed that have been selected manually by the user and/or automatically by the system. Storage policy module 402 also uses information about the available free space on the different volumes 410, 411 to determine precisely where each of the desired number of copies of each file should be placed. Storage policy module 402 interfaces with replicator 301 via WMI interface 401. For instance, if user Abby has specified that she wants to keep three copies of every photo, then storage policy module 402 will direct replicator 301 to create three full copies of every JPG or RAW file (for instance) that it replicates. Storage policy module 402 will also determine where each of those copies are to be stored. In addition, a storage user interface (UI) module 403 provides information to the user about the state of the system so that the user may select, define, or modify the storage policy in an informed manner. Storage UI module 403 also allows the user to indicate to the system that the user wishes to retire and/or remove a physical storage resource such as a hard drive. Storage UI module 403 may be, for example, part of the shell of the operating system.

In addition to storage policy module 402 controlling ghosting, this control may be available to any software application. In particular, an application programming interface (API) may be made available to software developers for controlling ghosting. The API may provide a software application with an interface that allows the software application to specify a particular file or set of files (e.g., a folder of files), and whether that file or files should be ghosted or unghosted. The API may also provide an interface that allows the software application to specify on which volumes a copy of a particular file or set of files should be stored in full. In addition, the API may provide an interface that allows the software application to define or modify the storage policy. The API may further provide an interface that allows the software application to pin a file or set of files to a particular volume (i.e., to require that a full copy of the file or files is always stored on a particular volume). The user may further pin the file or files to an offline option, which results in those files being available even when one or more, or even all, of the secondary volumes are unavailable. For example, pinning a file to the offline option may cause a full copy of the file to always be stored in primary volume 410. In addition to the API, each of these interfaces may be made available directly by the user, such as through controls provided by the operating system itself. For example, the user may be presented with a graphical slider control for a given file or set of files that allows the user to easily select from a range of replication levels for that file or files.

Figure 9:
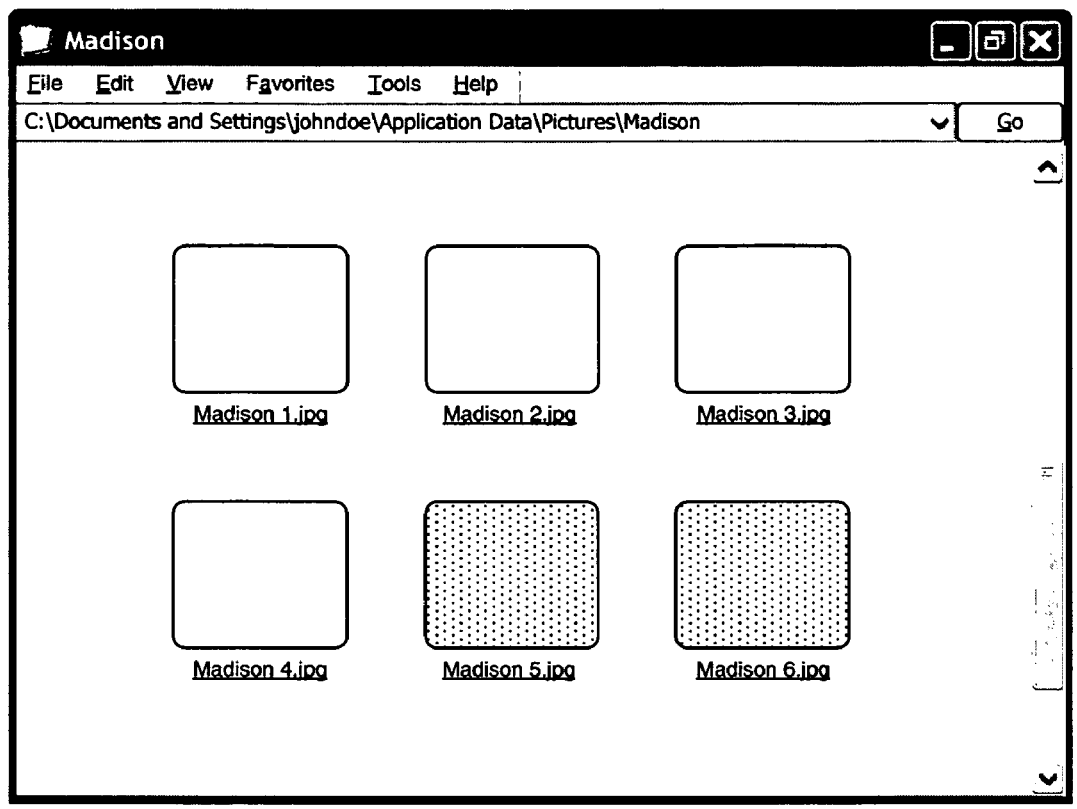
FIG. 9 is a screenshot of an illustrative user interface that presents files stored on a plurality of volumes as though they were all stored on a single volume.

As previously discussed, from the user's point of view, all of the user's files are located on the user's main volume (such as the C: drive). For example, the screenshot of FIG. 9 may be displayed to the user upon browsing through a directory of the C: drive. In this example, six photos named Madison 1.jpg through Madison 6.jpg are shown as being available on a folder in the C: drive of computer 201. In actuality, the file contents of Madison 1.jpg through Madison 4.jpg are physically located on the C: drive (which in this example would be primary volume 410), and the file contents of Madison 5.jpg and Madison 6.jpg are physically located on secondary volume 411. Instead, merely the metadata for those two files are located on the C: drive. In other words, the last two files are ghosted on the C: drive. However, from the user's point of view, all six of the photos are available from this particular folder of the C: drive. If desired, the user may be presented with a visual differentiation between those files that are actually stored on the C: drive and those that are ghosted. For instance, ghosted files may be partially transparent or be displayed with less contrast, as represented in FIG. 9 by the shading of Madison 5.jpg and Madison 6.jpg.

Figure 5:
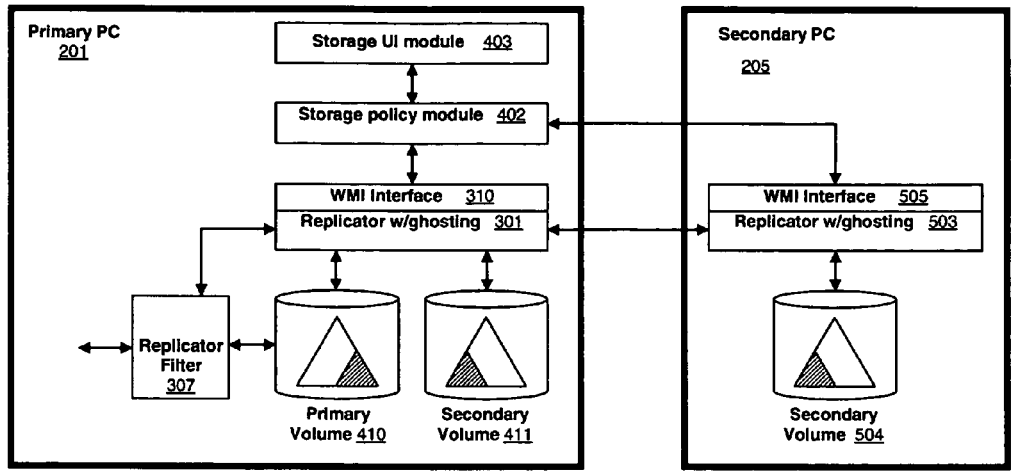
FIG. 5 is a functional block diagram of another illustrative distributed storage system including the file replication system of FIG. 3.

Thus far, the discussion with regard to FIG. 4 has assumed that all of the physical storage resources 410, 411 have been locally controlled by the same computer 201. However, some or all of these physical storage resources may be remote to computer 201 and not under the directed control of computer 201. For example, such physical storage resources may include a hard drive controlled by another computer 205 or 212 such as a home server or media center. FIG. 5 shows an example of such a situation. In this example, secondary volumes 411 and 504 are distributed across multiple different machines, computer 201 and computer 205. Computer 201 also contains primary volume 410. The shown configuration is of course merely illustrative; more than two computers may be used, and storage volumes may be distributed between the various computers in any manner desired. In addition, storage volumes may be devices that can control their own storage in and of themselves without the need for direct control by a separate computer.

In the shown embodiment, each computer 201, 205 runs its own instance of replicator 301 (the replicator instance run on computer 205 will be referred to as replicator 503, with its own WMI interface 505). These replicator instances 301, 503 communicate with each other (using a file transfer or replication protocol) to replicate data across a network, in this case LAN 207. Multiple replicator instances may communicate with each other in any network interconnection topology. However, as in the present example, where the number of machines involved is small a full mesh or a star topology may be desirable.

Figure 10:
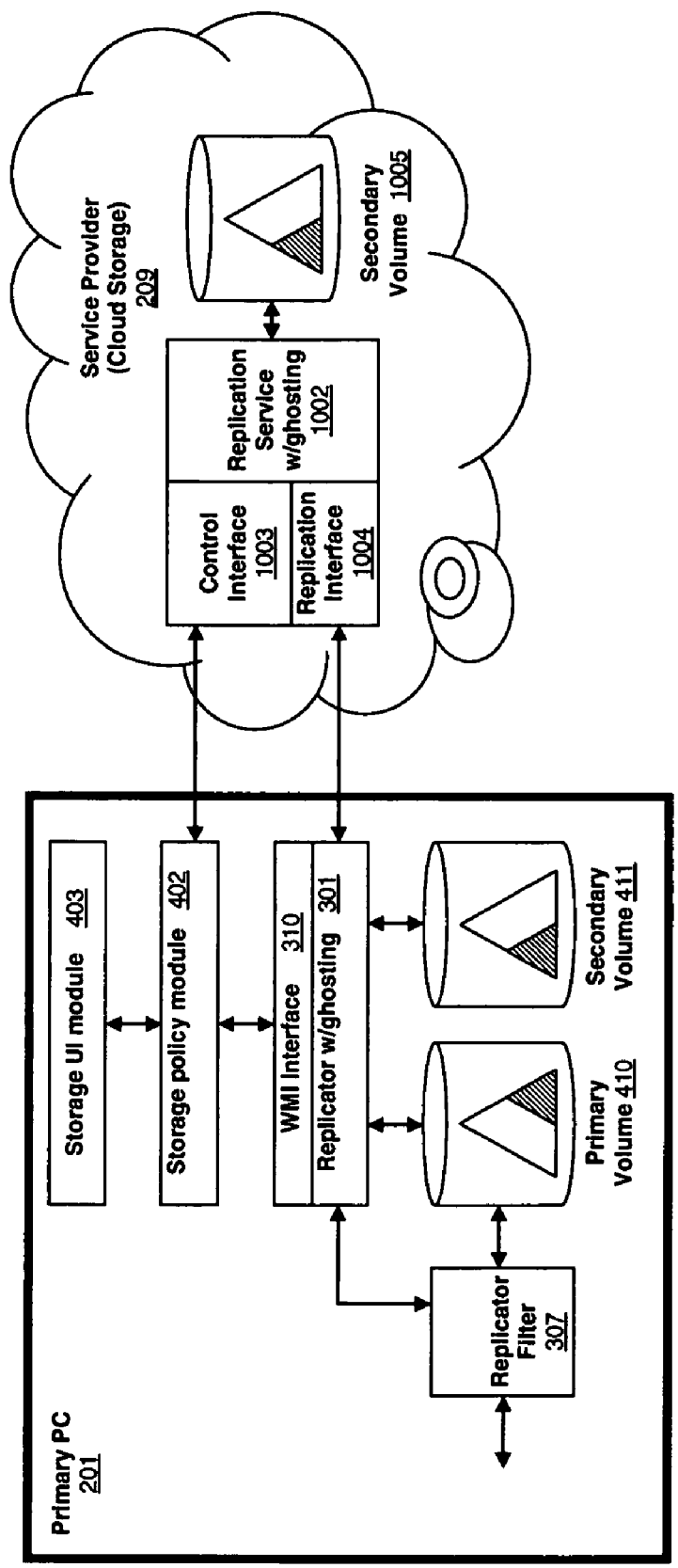
FIG. 10 is a functional block diagram of another illustrative distributed storage system including the file replication system of FIG. 3 and cloud storage.

Yet another option with regard to FIG. 4 is to provide secondary volume 411 as cloud storage, such as cloud storage provided by service provider 209. FIG. 10 shows an example of such a situation where a secondary volume 1005 is implemented as cloud storage. In this example, service provider 209 is running its own instance of a replication service 1002. Computer 201 may access a control interface 1003 of service provider 209 for control purposes, and a replication interface 1004 for the actual file replication or transfer. In one embodiment, secondary volume 1005 is implemented on top of an existing local file system, in a manner similar to the one discussed for local secondary volumes 411. In an alternate embodiment, secondary volume 1005 may be implemented without using a local file system; this will not be visible to computer 201 as long as control interface 1003 and replication interface 1004 remain unchanged.

Figure 6:
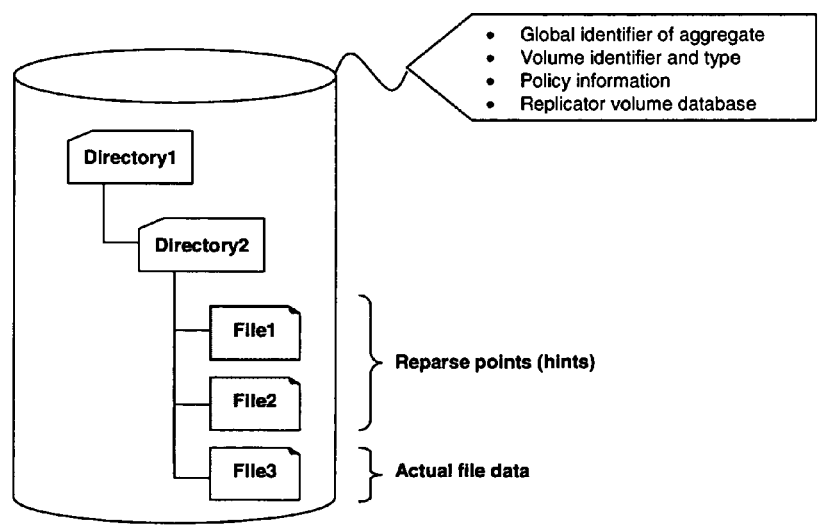
FIG. 6 is a functional block diagram of an illustrative volume in a distributed storage system.

FIG. 6 shows an illustrative structure of either primary volume 410 or secondary volume 411. As discussed previously, the volumes are implemented by leveraging a local file system. Metadata is stored in each volume 410, 411 so that it is available from all volumes 410, 411. The metadata that is stored in a protected part of the directory tree (such as in the "C:\System Volume Information" directory) may include a global identifier such as a serial number, a volume identifier such as a volume number, various storage policy information, and/or various other metadata.

The global identifier is associated with the distributed storage system in the aggregate. That is, the global identifier identifies the collection of primary and secondary volumes 410, 411 making up this particular instance of the distributed storage system. The global identifier is maintained for consistency verification purpose. For instance, if a hard drive belonging to some other distributed storage system is attempted to be added to the present user's distributed storage system, the user may be warned about this fact so that the user may decide whether to allow the contents of that hard drive to be merged into the user's distributed storage system, or whether to ignore the hard drive and treat it as a storage resource separate from the user's distributed storage system. Likewise, a volume without a serial number will not be considered to be part of an aggregate, which allows for differentiation between different types of volumes that can be connected to the computer. For example, digital camera 202 may or may not be allowed to be included as part of the user's distributed storage system.

The volume identifier uniquely identifies a volume and/or its type (e.g., primary or secondary) in the context of the aggregate storage resources in the distributed storage system. The volume identifier allows a particular volume to be individually addressed and identified by the user and/or the system as needed.

The storage policy information may include various criteria and/or other factors that are used by storage policy module 402 to implement the storage policy. For example, the replication level may be stored in the storage policy information of volumes 410, 411. The storage policy information may be replicated to all of volumes 410, 411, thus making that information highly fault tolerant.

In addition, various other metadata may be stored in volumes 410, 411 as needed by replicator 301, 503. Such metadata may include, e.g., a replication database that tracks what files have been replicated and where the copies are stored, as well as configuration information.

As discussed above, some of the files stored on the volume may be ghosted, shown as grayed out in FIG. 6. Others of the files may have their actual file data stored on the volume, shown as the white files in the volume of FIG. 6. In addition to the regular metadata stored in the reparse points attached to ghosted files, a set of hints, or handles, may be stored that identify which volumes in the aggregate contain the actual file data.

For example, when a file is accessed for read (remember that this preferably always happens on the primary volume), and if the file is not ghosted, then the access is allowed to proceed as usual. However, if the file is ghosted, then replicator 301 may be directed to either stream the requested data from one of the non-ghosted copies of the file (from one of secondary volumes 411, 504, 1005). Alternatively, replicator 301 may unghost the file by copying the actual file data from one of secondary volumes 411, 504, 1005.

The hints associated with the reparse point may be used to quickly locate a secondary volume that contains a non-ghosted version of the file. If the hints are out of date, then replicator 301 may need to search through all of secondary volumes 411, 504, 1005. Replicator 301 may search the various secondary volumes serially or in parallel, the latter of which may reduce the time needed for searching. Replicator 301 would then select the first secondary volume that responds that it has a complete copy of the file.

When creating a file, files are preferably always created on the primary volume. Responsive to the newly-created file being closed and/or saved (and/or on a periodic basis regardless of closing or saving the file), replicator 301 will replicate the file. Storage policy module 402 may inform replicator 301 as to which of secondary volumes 410, 411, 504, 1005 should store full copies of the file and which should store only a ghosted version of the file. As previously mentioned, storage policy module 402 may make this determination based on the storage policy and how the storage policy particularly applies to the file in question. In addition, storage policy module 402 may make this determination based on information other than the storage policy, such as the remaining free space on primary and/or secondary volumes 410, 411, 504, 1005. In addition to informing replicator 301 as to where to direct replicated files, storage policy module 402 may also supply the hints that will be stamped on the reparse points of the ghosted files.

The same applies to modifying files. However, before a ghosted file can be modified, the actual file data may be moved to primary volume 410 using the unghosting features of replicator 301.

Because primary volume 410 is the main working volume where new and modified files reside, it is preferable to ensure that sufficient space is always maintained on primary volume 410. Thus, to ensure sufficient space is maintained and/or to reclaim space on primary volume 410, storage policy module 402 may direct replicator 301 to periodically examine the files on primary volume 410 and choose one or more candidates for ghosting. Once sufficient full copies of the chosen files have been created on secondary volumes 411, 504, 1005, the chosen files may then be ghosted on primary volume 410.

Figure 7:
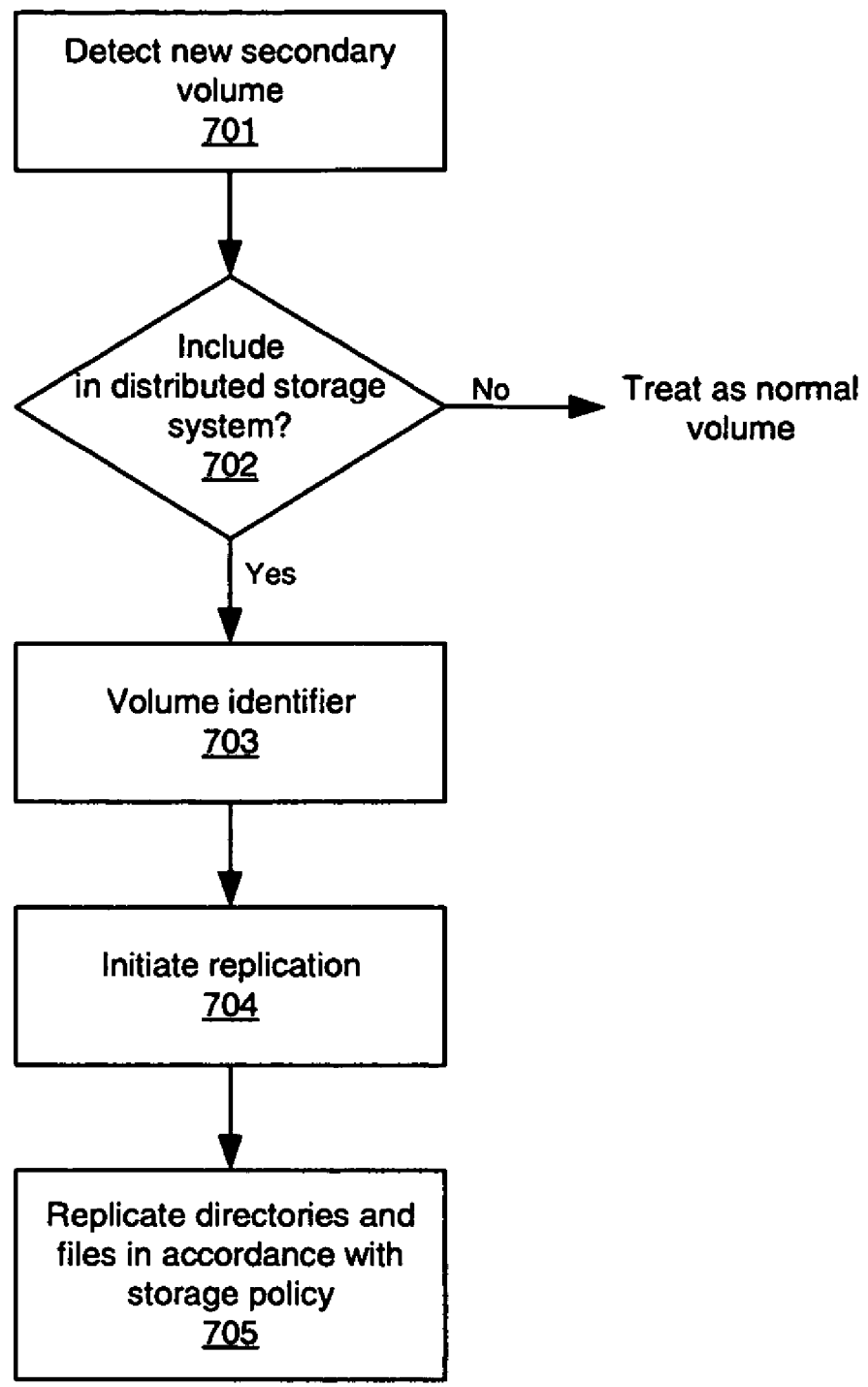
FIG. 7 is a flowchart showing illustrative steps that may be performed in connection with expanding an aggregate storage resource to include a new volume.

Referring to FIG. 7, the following steps may be performed when a new secondary volume is added, such as a new hard drive. First, the addition of the new secondary volume is detected in step 701. In response, in step 702 storage UI module 403 validates with the user whether the new secondary volume should be included in the distributed storage system. If not, then the secondary volume is treated as a normal added volume. However, if the user indicates that the new secondary volume is to be included, then in step 703 storage policy module 402 creates a volume identifier to mark the new secondary volume as being part of the distributed storage system (as illustratively shown in FIG. 6). In addition, in step 704 storage policy module 402 initializes replication for this volume. In response, in step 705 replicator 301 replicates all of the directories to the new secondary volume, as well as the files. When replicating files, replicator 301 queries storage policy module 402 as to whether the files should be replicated as ghosted files or replicated in full. In one embodiment, all files may be initially replicated as ghosted files, and storage policy module 402 may later decide to perform rebalancing and move the full copies (i.e., actual file data) of some of the files from other secondary volumes to the new secondary volume, following which some of the full copies on the other secondary volumes may be ghosted.

Figure 8:
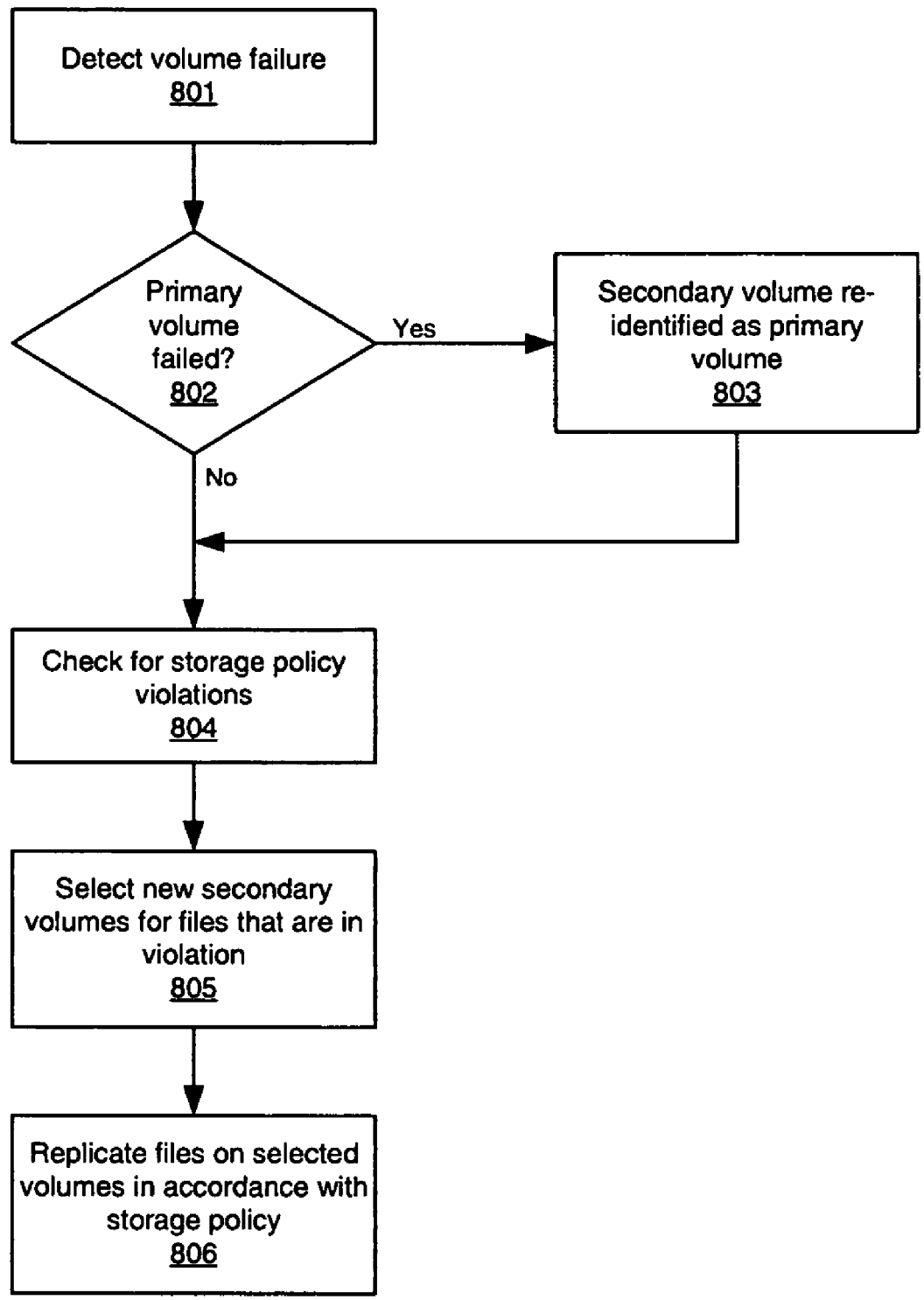
FIG. 8 is a flowchart showing illustrative steps that may be performed in connection with unavailability of a volume.

Referring to FIG. 8, the following steps may be performed if one of the volumes in the distributed storage system fails, such as by being removed unexpectedly or due to actual device failure. First, failure of a volume is detected in step 801. If the primary volume has failed (step 802), then one of the secondary volumes is chosen in step 803 to be the new primary volume, and that new secondary volume is identified as such. Next, in step 804 storage policy module 402 directs replicator 301 to walk the file systems on all volumes (both primary and secondary) and detects which files are now in violation of the storage policy. For example, the number of copies of a file may be below the desired replication level for that file, thus resulting in a storage policy violation for that file. This may occur where full file copies were located on the failed volume. For those files that are found to be in violation, storage policy module 402 selects new secondary volume(s) in step 805 and directs replicator 301 to make copies as needed in step 806. Steps 805 and 806 may occur in parallel. At this point, storage policy module 402 may also direct replicator 301 to update the hints stamped on the reparse points of the ghosted files.

In addition to detecting actual volume failures, storage policy module 402 may also predict upcoming volume failures so that warnings may be provided before failures are likely to actually occur. For example, storage policy module 402 may monitor retry statistics for the various disks as well as periodically scan entire volume contents. These scans may be performed at the logical level by reading all of the files on the volume, or more efficiently at the physical level by reading all of the blocks. By performing such scans, the safety of the data on various volumes may be estimated by determining whether the data on a given volume is readable and passes certain data checks such as a standard disk drive CRC check. If bad sectors or other disk problems are detected, then storage UI module 403 may warn the user or another software application of the problem. In addition, storage policy module 403 may direct replicator 301 to migrate data off of the failing volume. Migration need only occur for those files that are stored in full on that volume. If, for a given file, only metadata is stored on that volume, then replication of the metadata is unnecessary since the metadata is already replicated across all of the other volumes. Once migration is complete, storage UI module 403 may prompt the user to replace the volume.

In the illustrative embodiments described herein, it is expected that there should be no conflicts, since updates occur on the primary volume. However, in the event that a secondary volume is updated without the primary volume being updated, a conflict may arise that may need to be resolved by replicator 301. To detect and/or deal with such conflicts, replicator 301 may perform one or more of the following illustrative techniques. In one technique, replicator 301 may decide on a winner (e.g. most recent change wins) and place the loser in a special directory in the event that the user ever needs to retrieve that data. According to another technique, replicator 301 may expose an API through which an interested application may become aware of a conflict and/or change the resolution of such a conflict post-factum. Using a third technique, replicator 301 may allow applications to define content-specific handlers that will be called when a conflict for that particular content type (e.g. word-processing documents) is detected. The content-specific handlers may, in response, determine which of the conflicting files should be the winner. For example, the winner may be determined as a merging of the contents of the conflicting files.

In addition to using the user's own computer 201, the user may access his or her data using another user's computer that is not necessarily under the administrative control of the user. For example, the user may access his or her files through an Internet website presence. The user's own computer 201, as well as any other devices such as peers and cloud storage that are part of the distributed storage system, may be accessible in the aggregate via the Internet website. The website may provide the same file access point of view to the user as if the user were accessing the files from his or her own computer. The user may even see files on another user's separate distributed file system. For example, user A may be able to use an Internet website to access files on user B's distributed file system, if user B decides to share such files. A user may thus designate any file or set of files as being shareable with other designated users as desired. In addition, user A may be notified that a file from user B is ready to be shared with user A, such as via an automatically-created email. The email may include a link to the Internet website provides shared access to the file.

Thus, new solutions have been described that provide users with a way to easily, reliably, efficiently, and flexibly maintain their data. In particular, a logical file system has been described that distributes copies of files across various different physical storage resources yet provides a consistent view to the user of his or her data, regardless of which machine the user is accessing the files from, and even when the user's computer is offline. The distributed file system uses smart data redundancy to enable a virtually infinite amount of storage as long as additional storage resources are made available to the distributed file system. The result is a reliable storage system that does not necessarily tie the user's data to the user's particular computer. Instead, the user's data is associated with the user—for life—or for however long the user would like the data to be maintained, regardless of whether the user's computer or data storage components are replaced or destroyed.

What is claimed is:

1. At least one computer-readable storage medium including an article of manufacture that stores computer-executable instructions that, when executed by a computer, cause the computer to perform a method comprising:

replicating all directory structure of a file system of the computer from a primary volume of the computer to each of at least one secondary volume, wherein the directory structure identifies each of a plurality of files stored in the file system on the primary volume, and wherein, in response to the replicating all the directory structure, all of the directory structure of the file system is replicated on each of the at least one secondary volume;

replicating all file metadata of the file system from the primary volume to the each of the at least one secondary volume, wherein the file metadata describes the each of the plurality of files stored in the file system on the primary volume, and wherein, in response to the replicating all the file metadata, all of the file metadata of the file system is replicated on each of the at least one secondary volume;

ghosting, in response to the replicatings, file data of the file system from the primary volume to one of the at least one secondary volume, wherein the ghosted file data comprises a subset of files of the plurality of files stored in the file system on the primary volume, and wherein the ghosting comprises replicating the subset of files to the at least one secondary volume and removing the replicated subset of files from the primary volume and adding a unique reparse point to the primary volume for each of the replicated subset of files, and wherein each unique reparse point is stamped with hints that identify the at least one secondary volume as storing the ghosted file data;

requesting from the primary volume one of the subset of files;

unghosting, in response to the requesting, the one of the subset of files, wherein the unghosting includes copying the one of the subset of files from the one of the at least one secondary volume to the primary volume, and wherein the copying is based on the hints stamped on the unique reparse point of the one of the subset of files; and providing, in response to the requesting, the unghosted one of the subset of files from the primary volume.

2. The at least one computer-readable storage medium of claim 1, wherein the computer comprises the primary volume, and wherein the second volume is at least a portion of cloud storage provided by a service provider.

3. The at least one computer-readable storage medium of claim 1, wherein the first volume is a local volume, and wherein the each of the at least one secondary volume are remote to the computer.

4. The at least one computer-readable storage medium of claim 1, the method further comprising providing an interface configured to present the plurality of files including the subset of files as all being stored on the primary volume.

5. The at least one computer-readable storage medium of claim 1, the method further comprising:

adding another volume to the at least one secondary volume;

replicating all of the directory structure from the primary volume to the another volume;

replicating all of the file metadata from the primary volume to the another volume; and ghosting other file data from the primary volume to the another volume, wherein the ghosted other file data comprises file data for each of another subset of the plurality of files that is distinct from the subset of files, and wherein the ghosting the other file data comprises replicating the another subset of the plurality of files to the another secondary volume and removing the replicated another subset of the plurality of files from the primary volume and adding another unique reparse point to the primary volume for each of the replicated another subset of the plurality of files.

6. The at least one computer-readable storage medium of claim 5, the method further comprising:

requesting from the primary volume one of the another subset of the plurality of files; and providing, in response to the requesting, the one of the another subset of the plurality of files from the another volume.

7. The at least one computer-readable storage medium of claim 1, the method further comprising:

storing a new file on the primary volume;

detecting that the stored new file has been closed;

replicating new directory structure regarding the stored new file from the primary volume to the each of at least one secondary volume;

replicating new file metadata regarding the stored new file from the primary volume to the each of the at least one secondary volume; and ghosting new file data of the stored new file from the primary volume to one of the each of the at least one secondary volume.

8. The at least one computer-readable storage medium of claim 1, the method further comprising:

replacing, on the primary volume, the unghosted one of the subset of files with a modified version of the unghosted one of the subset of files;

detecting that the modified version has been closed; and ghosting, in response to the detecting, modified version file data from the primary volume to one of the each of the at least one secondary volume.

9. At least one computer-readable storage medium including an article of manufacture that stores computer-executable instructions that, when executed by a computer, cause the computer to perform a method comprising:

defining a storage policy;

replicating all directory structure of a file system of the computer from a primary volume of the computer to each of a plurality of secondary volumes, wherein the directory structure identifies each of a plurality of files stored in the file system on the primary volume, and wherein, in response to the replicating all the directory structure, all of the directory structure of the file system is replicated on each of the plurality of secondary volumes;

replicating all file metadata of the file system from the primary volume to each of the plurality of secondary volumes, wherein the file metadata describes the each of the plurality of files stored in the file system on the primary volume, and wherein, in response to the replicating all the file metadata, all of the file metadata of the file system is replicated on each of the plurality of secondary volumes; and ghosting, in response to the replicatings and according to the storage policy, file data of the file system from the primary volume to at least two of the plurality of secondary volumes, wherein the ghosted file data comprises a subset of files of the plurality of files stored in the file system on the primary volume, and wherein the ghosting comprises replicating the subset of files to the at least one secondary volume and removing the replicated subset of files from the primary volume and adding a unique reparse point to the primary volume for each of the replicated subset of files, and wherein each unique reparse point is stamped with hints that identify a secondary volume of the plurality of secondary volumes as storing a corresponding file of the subset of files.

10. The computer-readable storage medium of claim 9, wherein the storage policy designates the at least two of the plurality of secondary volumes.

11. The computer-readable storage medium of claim 9, the method further comprising updating the replicated directory structure on each of the plurality of secondary volumes, wherein the updating is performed in response to a modification to the directory structure.

12. The computer-readable storage medium of claim 9, the method further comprising:

adding another volume to the at least one secondary volume;

replicating all the directory structure from the primary volume to the another volume; and replicating all the file metadata from the primary volume to the another volume.

13. The computer-readable storage medium of claim 12, the method further comprising:

requesting from the primary volume one of another subset of the plurality of files; and providing, in response to the requesting, the one of the another subset of the plurality of files from the another volume.

14. The computer-readable storage medium of claim 9, the method further comprising selecting a new primary volume in response to unavailability of the primary volume.

15. The computer-readable storage medium of claim 9, the method further comprising providing an interface configured to present the plurality of files including the subset of files as all being stored on the primary volume.

16. The computer-readable storage medium of claim 9, the method further comprising:
- storing a new file on the primary volume;
- detecting that the stored new file has been closed;
- replicating new file directory information regarding the stored new file from the primary volume to the each of the plurality of secondary volumes;
- replicating new file metadata regarding the closed new file from the primary volume to the plurality secondary volumes; and
- ghosting new file data of the closed new file from the primary volume to at least one of the plurality secondary volumes.

17. A method, comprising:
- defining a storage policy;
- replicating all directory structure of a file system of a computer from a primary volume of the computer to each of a plurality of secondary volumes, wherein the directory structure identifies each of a plurality of files stored in the file system on the primary volume, and wherein, in response to the replicating all the directory structure, all of the directory structure of the file system is replicated on each of the plurality of secondary volumes;
- replicating all file metadata of the file system from the primary volume to each of the plurality of secondary volumes, wherein the file metadata describes the each of the plurality of files stored in the file system on the primary volume, and wherein, in response to the replicating all the file metadata, all of the file metadata of the file system is replicated on each of the plurality of secondary volumes; and
- ghosting, in response to the replicatings and according to the storage policy, file data of the file system from the primary volume to at least two of the plurality of secondary volumes, wherein the ghosted file data comprises a subset of files of the plurality of files stored in the file system on the primary volume, and wherein the ghosting comprises replicating the subset of files to the at least one secondary volume and removing the replicated subset of files from the primary volume and adding a unique reparse point to the primary volume for each of the replicated subset of files, and wherein each unique reparse point is stamped with hints that identify a secondary volume of the plurality of secondary volumes as storing a corresponding file of the subset of files.

18. The method of claim 17 wherein the storage policy designates the at least two of the plurality of secondary volumes.

19. The method of claim 17 further comprising updating the replicated directory structure on each of the plurality of secondary volumes, wherein the updating is performed in response to a modification to the directory structure.

20. The method of claim 17 further comprising:
- adding another volume to the plurality of secondary volumes;
- replicating all the directory structure from the primary volume to the another volume; and
- replicating all the file metadata from the primary volume to the another volume.

* * * * *